A. A. SANDFORD.
Elevator and Fountain.

No. 225,646. Patented Mar. 16, 1880.

WITNESSES:
Jas. E. Hutchinson.
W. B. Hale

INVENTOR
Amzi A Sandford
By Fred W. Royce
Atty.

2 Sheets—Sheet 2.

A. A. SANDFORD.
Elevator and Fountain.

No. 225,646. Patented Mar. 16, 1880.

WITNESSES:
Jas. E. Hutchinson.
W. B. Hale.

INVENTOR-
Amzi A. Sandford.
By Fred W. Royce
Atty

UNITED STATES PATENT OFFICE.

AMZI A. SANDFORD, OF MONT CLAIR, NEW JERSEY.

ELEVATOR AND FOUNTAIN.

SPECIFICATION forming part of Letters Patent No. 225,646, dated March 16, 1880.

Application filed August 7, 1879.

*To all whom it may concern:*

Be it known that I, AMZI A. SANDFORD, of Mont Clair, in the county of Essex and State of New Jersey, have invented certain new and useful Improvements in Elevators and Fountains; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to automatically produce a constant aeration of the water of aquariums, thereby guaranteeing the keeping of the water in a healthy condition for the animals with which an aquarium is usually stocked.

It consists in a combination of devices for elevating the water from the aquarium and discharging it into a tank, from which, by the action of gravity, it is conducted through a suitable pipe to form a jet rising above and falling back into the aquarium after the manner of a jet-fountain, as will be hereinafter more particularly described with reference to the accompanying drawings, in which—

Figure 1:
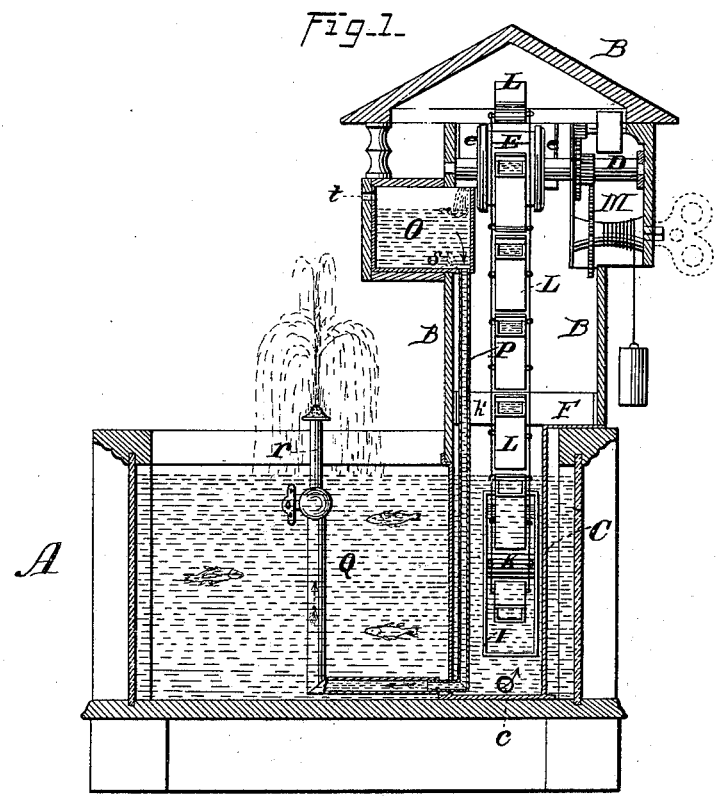
Figure 2:
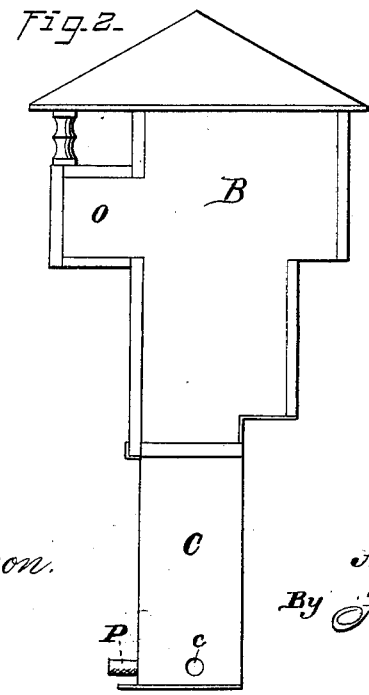
Figure 3:
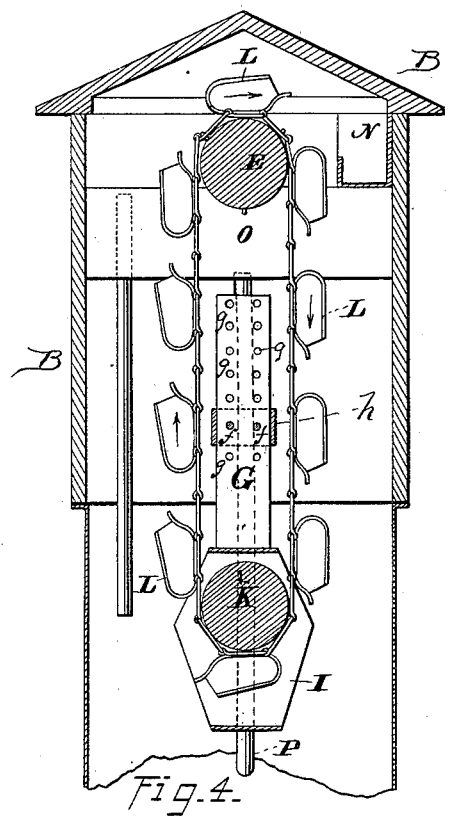
Figure 4:
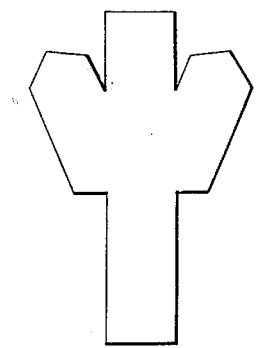

Figure 1 is a sectional view of an aquarium and my improvement. Fig. 2 is a side view of the casing and well of the elevating and discharging devices. Fig. 3 is a section on line $x\, x$, Fig. 1. Fig. 4 illustrates the blank from which a bucket of my elevating device is formed.

The letter A indicates the aquarium, which may be the usual rectangular box with glass walls, or of any other form desired.

The letter B indicates a casing, which I usually make of wood, and from the lower part of which extends downward a well, C, preferably formed of tin.

In the upper part of the casing is journaled a shaft, D, carrying a drum, E, provided with flanges $e$.

From the lower part of the casing projects an arm, F, inwardly. This arm carries at its inner end a flat guide, $h$, which is braced by being connected with a short arm, $h'$, secured to the front wall of the casing. In this guide $h$ slides an elongated plate, G, provided with two rows of perforations, $g$, which are adapted to be brought into coincidence with perforations $f$ in the guide $h$, and to be held by suitable pins passing through the coincident perforations. At its lower end the plate G carries a casing, I, in which is mounted a drum, K.

The letter L indicates a chain of buckets passing around the drums E and K.

The casing I, carrying the lower drum, stands in the well C, which well stands upon the bottom of the aquarium, and has in its wall openings $c$, through which the water may enter. The shaft D is connected with clock-work M, operated by a suitable weight, $m$, or it may be operated by a spring, and when said shaft is rotated by this clock-work the chain of buckets L is caused to travel on the drums E and K, after the manner of a chain-pump, raising the water from the aquarium and discharging it into a box or trough, N, from which it flows into a tank, O, located in the upper front portion of the casing, and having a pipe, P, leading downward therefrom within the casing and well to the bottom of the aquarium, bent outward through an aperture in the well and connecting with a bent pipe, Q, leading upward and terminating above the suface of the water in the aquarium, or above the water-line, and terminating in a nozzle, R, of any suitable description. The pipe Q is provided with a stop-cock, by which the flow of water may be cut off when desired.

At the point where the pipe P opens into the tank O a flap-valve, S, may be arranged to close the mouth of said pipe when desired, and near its top the tank O is provided with a horizontal slot, $t$, coinciding with a similar slot in the front wall of the casing, which will be hereinafter referred to.

The object in having the plate G adjustable by means of the perforations and pins is to cause a greater or less number of buckets of the chain to be submerged simultaneously in the water, and thus to regulate the speed of the travel of the chain. When the plate is forced downward as far as the bucket-chain will permit one more bucket will be submerged than when the plate, and consequently the drum K, are adjusted upward to the highest position in which the chain will work without the buckets striking against the lower wall of the casing I.

The tank O is provided with a suitable overflow-pipe, $u$.

The mode of operation of the invention to produce the fountain-jet, as shown in Fig. 1, will be obvious without further explanation; but the character of the device may be changed from the jet to a water-fall aerator by cutting off the flow of water through the pipe Q by means of its stop-cock, and closing the valve $s$ in the tank O at the mouth of the pipe P. The water which flows into the tank O will then rise in said tank and flow through the elongated slot $t$ in its front wall and through the coincident slot in the wall of the casing, falling in a sheet in the tank and keeping the water agitated, and consequently aerated.

Instead of the clock-work for driving the shaft D, any other suitable motive power may be used.

I do not limit myself to the form of casing shown, as it is obvious that it may be very greatly varied—as, for instance, it may be made in assimulation of a pile of rocks, or of a dolphin or other animal or fish, having the slot $t$ in the tank coinciding with its mouth.

What I claim is—

1. The combination of the shaft D, mounted in suitable bearings above the aquarium and carrying the drum E, the chain of buckets traveling on said drum, and the tank O, adapted to receive the water from said buckets, and provided with a suitable outlet discharging the water into the aquarium.

2. The combination, with the rotary drum E and the chain of buckets, of the lower drum, K, mounted in the casing I, provided with the upward-projecting plate G, adjustable vertically in the guide $h$, substantially as described.

3. The combination, with a water-elevator and an aquarium-tank, of the tank O, elevated above said aquarium-tank and provided with the pipe P, connected to the pipe Q, provided with a nozzle, said tank also being provided with the valve $s$ and slot $t$ in the upper part of its front wall, whereby the aquarium may be agitated and aerated by either the fountain-jet or water-fall.

In testimony that I claim the foregoing I have hereunto set my hand and seal this 2d day of August, 1879.

AMZI A. SANDFORD. [L. S.]

Witnesses:
J. WM. JOHNSON,
E. S. LESKOM.